US012593232B2

(12) United States Patent
Ito et al.

(10) Patent No.: US 12,593,232 B2
(45) Date of Patent: Mar. 31, 2026

(54) PROCESSING APPARATUS OF CELL-FREE COMMUNICATION SYSTEM

(71) Applicants: KDDI Research, Inc., Fujimino (JP); University of Southern California, Los Angeles, CA (US)

(72) Inventors: Masaaki Ito, Fujimino (JP); Issei Kanno, Fujimino (JP); Kosuke Yamazaki, Fujimino (JP); Andreas F. Molisch, Los Angeles, CA (US)

(73) Assignees: KDDI Research, Inc., Fujimino (JP); University of Southern California, Los Angeles, CA (US)

( * ) Notice: Subject to any disclaimer, the term of this patent is extended or adjusted under 35 U.S.C. 154(b) by 449 days.

(21) Appl. No.: 18/124,801

(22) Filed: Mar. 22, 2023

(65) Prior Publication Data

US 2024/0323726 A1     Sep. 26, 2024

(51) Int. Cl.
    *H04W 24/10*        (2009.01)
(52) U.S. Cl.
    CPC .................................... *H04W 24/10* (2013.01)
(58) Field of Classification Search
    CPC ..................................................... H04W 24/10
    See application file for complete search history.

(56) References Cited

U.S. PATENT DOCUMENTS

2022/0239429 A1 *  7/2022  Zhu ........................ H04L 5/0005

OTHER PUBLICATIONS

Emil Björnson et al., "Scalable Cell-Free Massive MIMO Systems", IEEE Transactions on Communications, Jul. 2020, pp. 4247-4261, vol. 68, No. 7 (15 pages).
Hien Quoc Ngo et al., "Cell-Free Massive MIMO Versus Small Cells", IEEE Transactions on Wireless Communications, Mar. 2017, pp. 1834-1850, vol. 16, No. 3 (17 pages).

* cited by examiner

*Primary Examiner* — Chuong A Ngo
(74) *Attorney, Agent, or Firm* — Foley & Lardner LLP

(57) ABSTRACT

A method performed by a processing apparatus of a cell-free communication system that includes a plurality of access points (APs) is provided. The method includes: transmitting, to a wireless device via a master AP among one or more APs included in a cluster associated with the wireless device, measurement information for the wireless device to determine a measurement target AP for which the wireless device measures a channel state; and receiving, as a response to the measurement information, channel state information indicating the channel state to the measurement target AP, via the master AP.

10 Claims, 3 Drawing Sheets

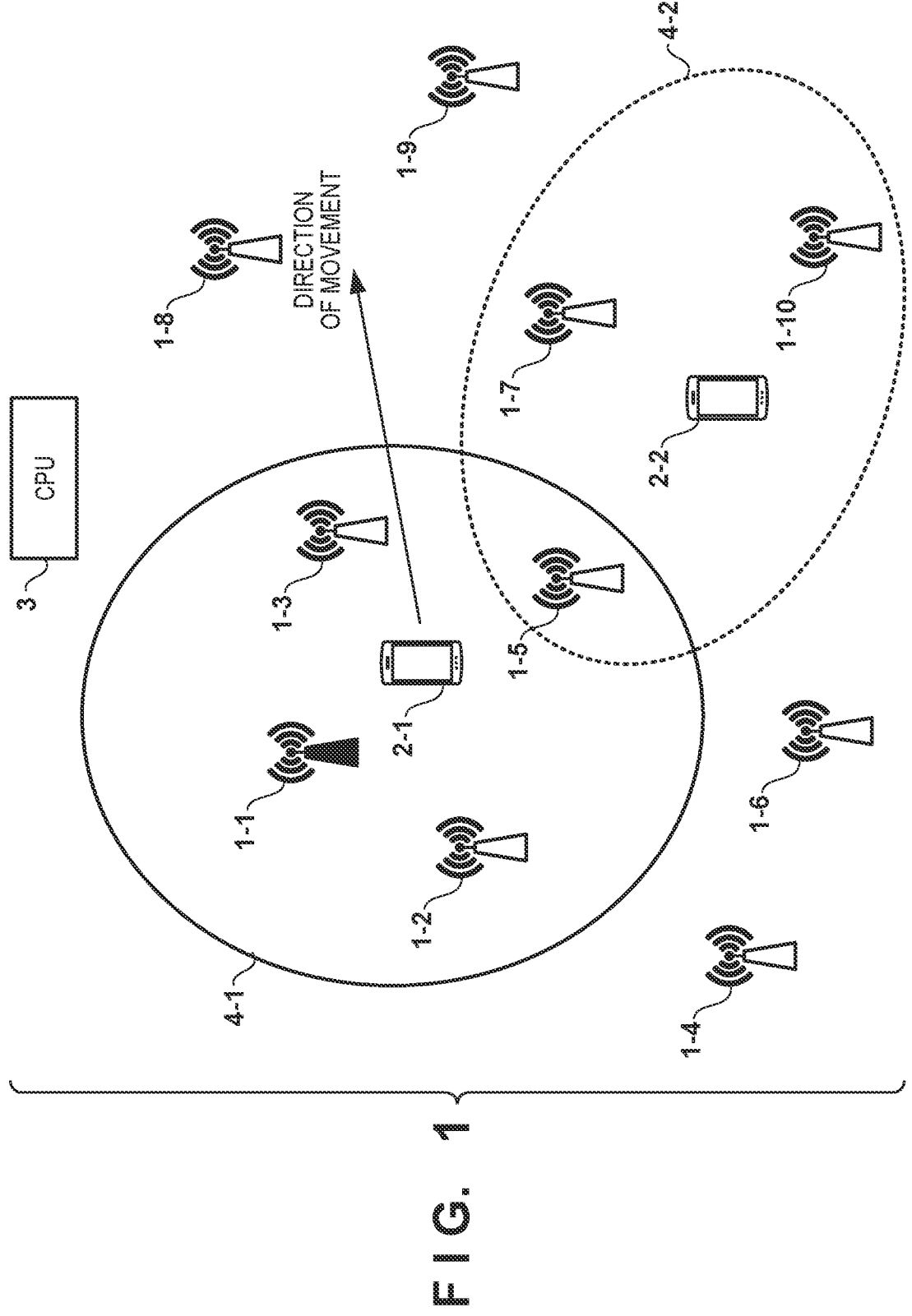
F I G. 1

F I G.  2
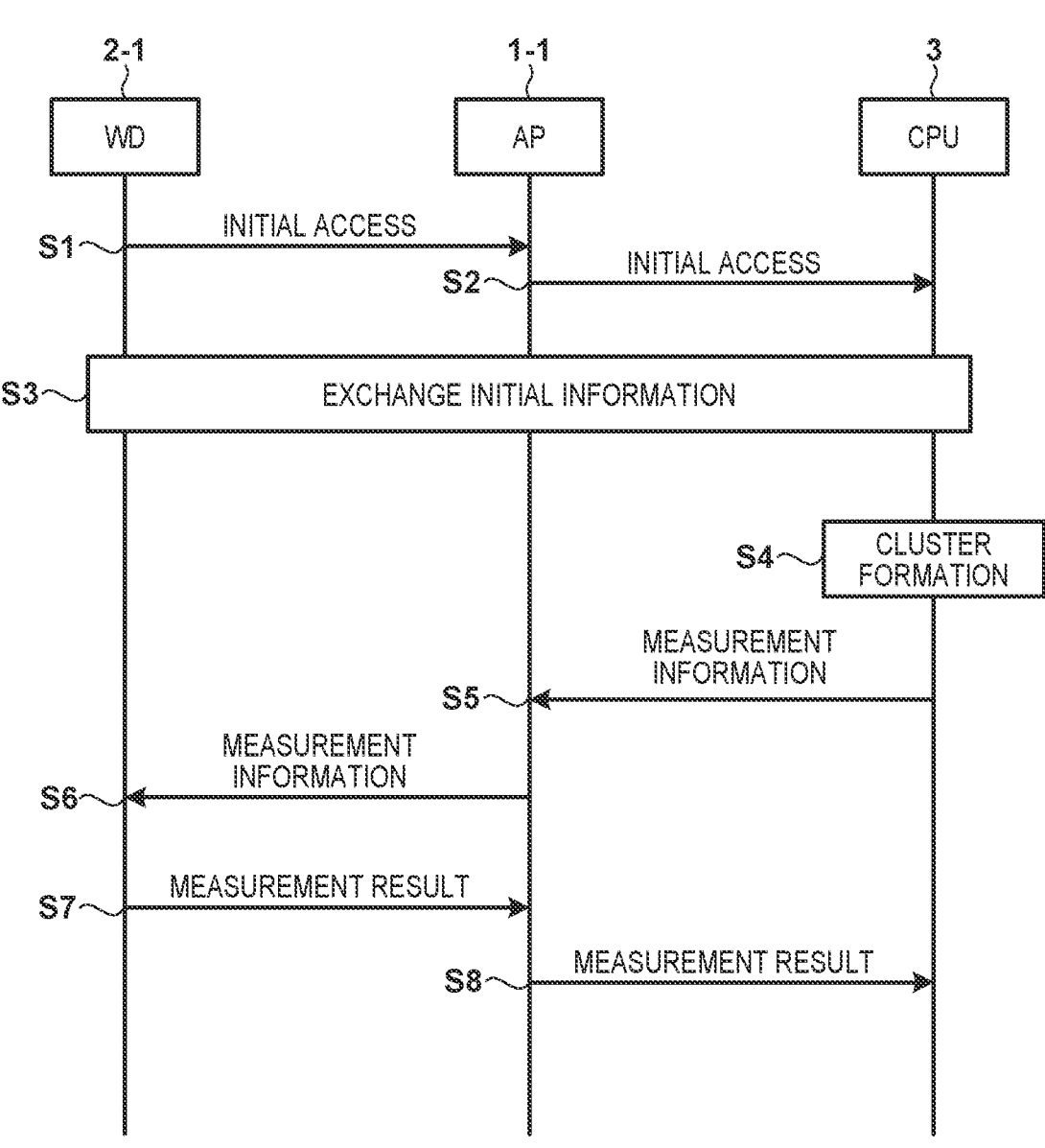

Figures 3, 4:
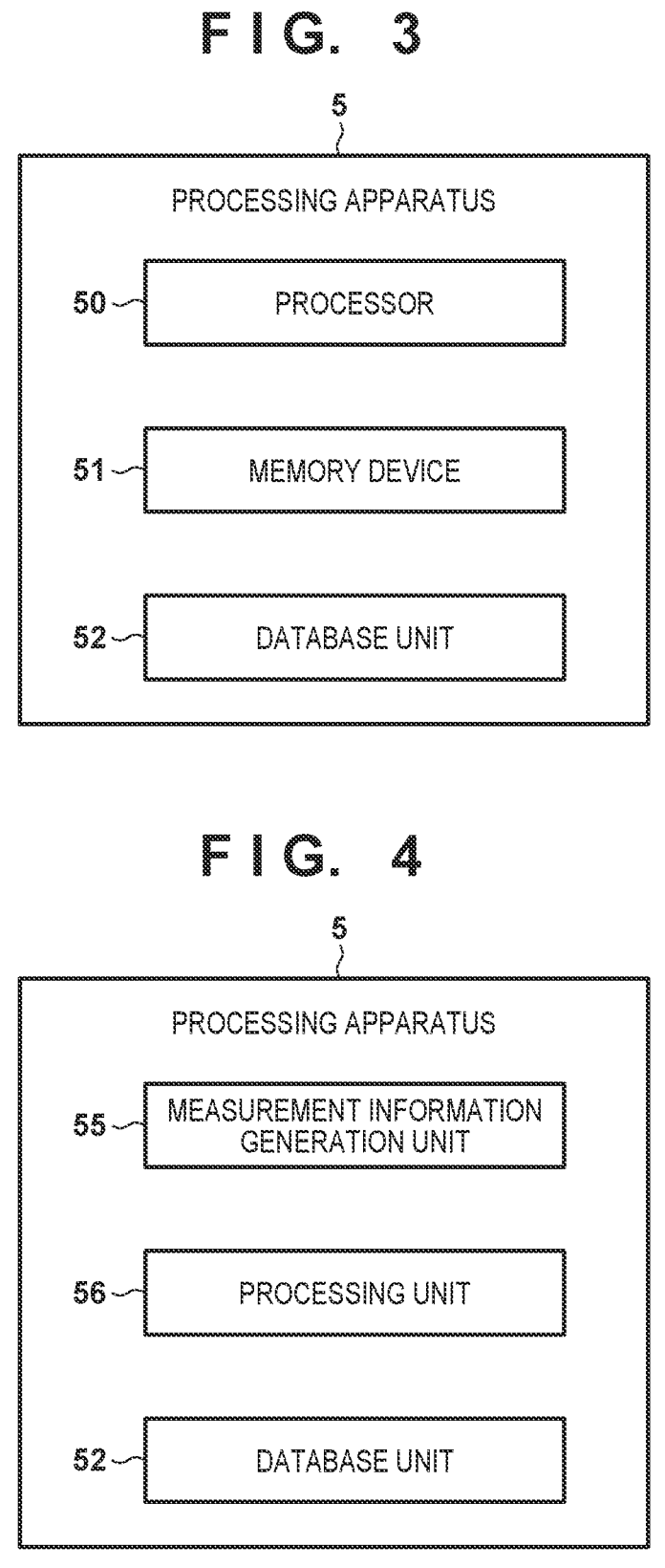

PROCESSING APPARATUS

50 ~ PROCESSOR

51 ~ MEMORY DEVICE

52 ~ DATABASE UNIT

PROCESSING APPARATUS

55 ~ MEASUREMENT INFORMATION GENERATION UNIT

56 ~ PROCESSING UNIT

52 ~ DATABASE UNIT

PROCESSING APPARATUS OF CELL-FREE COMMUNICATION SYSTEM

BACKGROUND OF THE INVENTION

Field of the Invention

The present disclosure relates to a cell-free communication system.

Description of the Related Art

In a cellular communication system, a service-provided area is divided into a plurality of cells, and communication services are provided by deploying base stations in the respective cells. In such a cellular communication system, each wireless device (WD), which is also referred to as a user equipment (UE), communicates with a base station of a cell in which this WD is present. In the cellular communication system, the communication quality in a boundary region of a cell is likely to decrease due to power attenuation of radiowaves from the base station and interference from neighboring cells.

For this reason, H. Q. Ngo, A. Ashikhmin, H. Yang, E. G. Larsson and T. L. Marzetta, "Cell-free massive MIMO versus small cells," in IEEE Trans. Wireless Commun., vol. 16, no. 3, pp. 1834-1850 March 2017 (hereinafter, referred to as Non-patent Literature 1) discloses a cell-free communication system. Similarly to a cellular communication system, also in the cell-free communication system, a plurality of access point (AP) are deployed in various geographical locations. The plurality of APs are connected to a central processing unit (CPU) via transmission paths. In the cell-free communication system, for example, the CPU selects one or more APs with which a WD is to wirelessly communicate, from the plurality of APs. The WD transmits/receives wireless signals to/from the one or more AP selected by the CPU, thereby communicating with the CPU via the one or more APs.

In the cell-free communication system, there is no conventional concept of "cell", and one or more APs that communicate with each WD are dynamically controlled by the CPU. A group of the one or more APs that communicate with one WD is referred to as a "cluster" for the one WD or a "cluster" associated with the one WD.

E. Björnson and L. Sanguinetti, "Scalable cell-free massive MIMO systems," in IEEE Trans. Commun., vol. 68, no. 7, pp. 4247-4261 July 2020 (hereinafter, referred to as Non-patent Literature 2) discloses cluster forming processing for forming a cluster for a WD, that is performed when the WD initially accesses a cell-free communication system. Furthermore, Non-patent Literature 2 also discloses setting an upper limit to the number of WDs with which one AP communicates with, in order to decrease a processing load of the CPU. In other words, Non-patent Literature 2 discloses setting an upper limit to the number of clusters to which one AP can belong.

In order for the CPU to dynamically control a cluster for each WD, the WD needs to measure the states of channels to APs, and provide feedback on channel state information indicating the measured channel states to the CPU. However, in a configuration in which the WD provides, to the CPU, feedback on states of channels to all of the APs from which a wireless signal can be received, the processing loads of the CPU and the WD increase. On the other hand, if the number of APs whose channel states are fed back by the WD is insufficient, a cluster for the WD cannot be appropriately configured.

SUMMARY OF THE INVENTION

The present disclosure provides a technique for a WD to appropriately provide feedback on channel state information.

According to an aspect of the present disclosure, a method performed by a processing apparatus of a cell-free communication system that includes a plurality of access points (APs), the method includes: transmitting, to a wireless device via a master AP among one or more APs included in a cluster associated with the wireless device, measurement information for the wireless device to determine a measurement target AP for which the wireless device measures a channel state; and receiving, as a response to the measurement information, channel state information indicating the channel state to the measurement target AP, via the master AP.

Further features of the present invention will become apparent from the following description of exemplary embodiments with reference to the attached drawings.

BRIEF DESCRIPTION OF THE DRAWINGS

FIG. 1 is a diagram of a configuration of a cell-free communication system that is used for describing an embodiment.

FIG. 2 is a diagram showing a communication sequence according to the embodiment.

FIG. 3 is a diagram of a hardware configuration of a processing apparatus according to the embodiment.

FIG. 4 is a diagram of functional blocks of the processing apparatus according to the embodiment.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a diagram of a configuration of a cell-free communication system that is used for describing an embodiment of the present invention. In FIG. 1, the cell-free communication system includes a plurality of APs 1-1 to 1-10. In the following description, the APs 1-1 to 1-10 are each referred to as an "AP 1" when there is no need to distinguish them from one another. In FIG. 1, the number of APs 1 is 10, which is exemplary, and the number of APs 1 in the cell-free communication system is not limited to 10. The APs 1 are connected to a CPU 3 using wired and/or wireless communication links. Furthermore, the CPU 3 is connected to a core network (not illustrated). Note that, in FIG. 1, for ease of illustration, communication links that connect the APs 1 to the CPU 3 are omitted. In addition, FIG. 1 shows one CPU 3 only, but a plurality of CPUs 3 can be deployed in the cell-free communication system. In the cell-free communication system, one AP 1 can be connected to one or more CPUs 3.

In addition, FIG. 1 shows two WDs, namely a WD 2-1 and a WD 2-2. In the following description, the WD 2-1 and the WD 2-2 are each referred to as a "WD 2" when there is no need to distinguish them from each other. The APs 1-1 to 1-3 and 1-5 in the solid line circle in FIG. 1 are in a cluster 4-1 for the WD 2-1. In addition, the APs 1-5, 1-7, and 1-10 in the dotted line circle in FIG. 1 are in a cluster 4-2 for the WD 2-2. Therefore, the WD 2-1 wirelessly communicates with the APs 1-1 to 1-3 and 1-5 included in the cluster 4-1, thereby communicating with the CPU 3 via the APs 1-1 to 1-3 and 1-5. Similarly, the WD 2-2 wirelessly communicates with the APs 1-5, 1-7, and 1-10 included in the cluster 4-2, thereby communicating with the CPU 3 via the APs 1-5, 1-7, and 1-10.

One master AP is set in the cluster for each WD 2 by the CPU 3. In FIG. 1, the master AP in the cluster 4-1 for the WD 2-1 is the AP 1-1. Similarly, one of the three APs 1 in the cluster 4-2 for the WD 2-2 is selected as a master AP by the CPU 3. Note that FIG. 1 shows two WDs 2 only, which is exemplary, and the number of WDs 2 that are provided with services from the cell-free communication system is not limited to two.

A communication sequence according to the present embodiment will be described below with reference to FIG. 2. Note that, at the start point in FIG. 2, the WD 2-1 is in an idle state. The WD 2-1 first selects one AP 1 from the plurality of APs 1 in the cell-free communication system, and, in step S1, transmits an initial access signal to the selected AP 1. In FIG. 2, the AP 1-1 is selected. The WD 2-1 measures reference signals transmitted by the APs 1, and makes initial access to an AP 1 from which the highest-quality reference signal was received, for example. The initial access signal can be a random access signal specified by 3GPP, for example. In step S2, the AP 1-1 that has received the initial access signal transmits an initial access signal to the CPU 3.

Subsequently, in step S3, the WD 2-1 and the CPU 3 exchange initial information via the AP 1-1. The initial information includes information required for the CPU 3 to configure a cluster for the WD 2-1. The initial information includes channel state information indicating the states of channels to the APs 1, measured by the WD 2-1 based on the reference signals received from the APs 1, for example. In step S4, the CPU 3 forms the cluster 4-1 (FIG. 1) associated with the WD 2-1 based on the initial information. Specifically, in step S4, the CPU 3 selects APs 1 that are used for communicating with the WD 2-1. Note that, at this time, the CPU 3 determines a master AP of the WD 2-1, from among the APs 1 in the cluster 4-1. In this example, in cluster formation at the time of initial access, the CPU 3 selects an AP 1 to which the WD 2 made initial access, as a master AP. Therefore, in this example, the AP 1-1 is selected as a master AP of the WD 2-1. Although not shown in FIG. 2, the CPU 3 communicates with the WD 2-1 via an AP 1 in the cluster 4-1.

In step S5, the CPU 3 transmits, to the master AP (the AP 1-1) of the WD 2-1, measurement information for the WD 2-1 to determine an AP 1 for which the WD 2-1 measures the channel state (hereinafter, referred to as an "measurement target AP 1"). In step S6, the master AP (the AP 1-1) notifies the WD 2-1 of the measurement information.

The WD 2-1 measures the state of the channel to the measurement target AP 1 in accordance with the measurement information, and, in step S7, transmits a measurement result to the master AP (the AP 1-1). The measurement result includes channel state information indicating the state of the channel to the measurement target AP 1. In step S8, the AP

1-1 that is a master AP transmits the measurement result to the CPU 3. The CPU 3 can perform scheduling of data to be transmitted/received to/from the WD 2-1, based on the measurement result, for example. In addition, the CPU 3 determines, based on the measurement result, whether or not the cluster for the WD 2-1 needs to be changed, and if the cluster needs to be changed, the CPU 3 can change the cluster for the WD 2-1.

Note that the master AP of the WD 2-1 can be changed when the cluster for the WD 2-1 is changed. Alternatively, the master AP of the WD 2-1 can be changed when the master AP is excluded from the cluster for the WD 2-1. The CPU 3 repeatedly performs the processing of steps S5 to S8 until the WD 2-1 enters an idle state.

The measurement target AP 1 will be described below. First, the CPU 3 can determine only the APs 1 included in the current cluster 4-1 for the WD 2-1, as the measurement target AP 1.

In addition, the CPU 3 can determine a neighboring AP 1 as the measurement target AP 1, in addition to or in place of the APs 1 included in the current cluster 4-1 for the WD 2-1. The neighboring AP 1 is an AP 1 that is not included in the cluster 4-1, and satisfies a predetermined condition. The predetermined condition can be that a neighboring AP 1 is an AP 1 from which the distance to an AP 1 included in the cluster 4-1 is within a predetermined value. In the example in FIG. 1, for example, in addition to or in place of the APs 1-1 to 1-3 and 1-5 included in the cluster 4-1, the APs 1-4 and 1-6 to 1-8 that are not included in the cluster 4-1 but to which the distances from one of the APs 1-1 to 1-3, and 1-5 are within the predetermined value can be the measurement target AP 1, as neighboring APs 1. By including a neighboring AP 1 as the measurement target AP 1, the CPU 3 can appropriately control a cluster in accordance with movement of the WD 2-1.

The CPU 3 can include all of the neighboring APs 1 as the measurement target AP 1. Alternatively, the CPU 3 can narrow down the neighboring APs 1 to APs 1 that are regarded as the measurement target AP 1. When, for example, the WD 2-1 is moving in the direction indicated by the arrow in FIG. 1, the CPU 3 can regard, as the measurement target AP 1, only the AP 1-7 and 1-8 whose distances from the WD 2-1 become shorter over time, from among the APs 1-4 and 1-6 to 1-8 that are neighboring APs 1. The CPU 3 can obtain channel state information for appropriately controlling a cluster while suppressing the processing loads of the WD 2 and the CPU 3 by narrowing down the neighboring APs 1 to APs 1 that are regarded as the measurement target AP 1 in consideration of the direction of the movement of the WD 2-1. Note that the CPU 3 can receive information regarding a change in the position of the WD 2-1 from the WD 2-1. In addition, the CPU 3 can determine a change in the position of the WD 2-1 by repeatedly obtaining, from an AP 1 included in the cluster 4-1 for the WD 2-1, the strength of a wireless signal received from the WD 2-1 by the AP 1.

Furthermore, a configuration can be adopted in which, if the number of WDs 2 connectable to each AP 1 is set in the AP 1, the CPU 3 regards, as the measurement target AP 1, only a neighboring AP 1 in which there is some room for more connection. Assume that, for example, the AP 1-7 is also selected for a cluster for a WD 2 (not shown) in addition to the WD 2-2, and thus, the number of WDs 2 connected to the AP 1-7 has reached an upper limit of the number of WDs 2 connectable to the AP 1-7, which is set in the AP 1-7. In this case, the CPU 3 regards a neighboring AP 1 other than the AP 1-7 as the measurement target AP 1. In addition, when the direction of movement of the WD 2-1 is taken into consideration, the CPU 3 regards only the AP 1-8 as the measurement target AP 1. Note that the CPU 3 adds the identifier of the measurement target AP 1 to the measurement information.

In addition, the measurement information is not limited to information directly indicating the measurement target AP 1, and can be configured to specify a selection condition on which a WD 2 selects the measurement target AP 1. The CPU 3 can transmit measurement information that includes, as a selection condition, the number N of APs 1 whose channel state information is to be notified, for example. In this case, the WD 2-1 informs the CPU 3 of N pieces of channel state information indicating the highest received signal qualities, along with the identifiers of the APs 1 thereof. Note that a signal quality is determined based on a reference signal transmitted by each AP 1. Alternatively, the WD 2-1 notifies the CPU 3 of N pieces of channel state information indicating the highest received signal strengths, along with the identifiers of the APs 1 thereof.

In addition, the CPU 3 can transmit measurement information that includes a threshold as a selection condition. In this case, the WD 2-1 notifies the CPU 3 of the channel state of the AP 1 in which the received signal quality is the highest, and the channel state of the AP 1 in which the degree of decrease in the signal quality relative to the AP 1 whose signal quality is the highest is within the notified threshold, along with the identifiers of the APs 1. Alternatively, the WD 2-1 notifies the CPU 3 of the channel state of the AP 1 in which the received signal strength is the strongest, and channel state of the AP 1 in which the degree of decrease in the signal strength relative to the AP 1 whose signal strength is the strongest is within the notified threshold, along with the identifiers of the APs 1.

In addition, the CPU 3 can transmit measurement information that includes a selection condition that notification is to be made on the state of the channel to an AP 1 whose receive signal strength increases over time, or whose signal quality increases over time. The CPU 3 can instruct the WD 2-1 to make notification on the state of the channel to an AP 1 whose signal strength or signal quality increased by at least a predetermined value from when the channel state was previously measured, for example. The CPU 3 can appropriately determine an AP 1 that is to be added to the cluster 4-1 for the WD 2-1, by obtaining the state of the channel to an AP 1 whose receive signal strength or signal quality increased over time.

In addition, the CPU 3 can transmit measurement information that includes a selection condition that notification is to be made on the state of the channel to an AP 1 whose receive signal strength decreases over time, or whose signal quality decreases over time. The CPU 3 can instruct the WD 2-1 to make notification on the state of the channel to an AP 1 whose signal strength or signal quality decreased by at least a predetermined value from when the channel state was previously measured, for example. The CPU 3 can appropriately determine an AP 1 that is to be excluded from the cluster 4-1 for the WD 2-1, by obtaining the state of the channel to an AP 1 whose received signal strength or signal quality decreased over time.

Note that the CPU 3 repeatedly transmits measurement information to the WD 2-1 (step S5 in FIG. 2), but the content of measurement information can be changed each time transmission is performed. After transmitting measurement information in which only the APs 1 included in the current cluster 4-1 are regarded as the measurement target AP 1, measurement information in which a neighboring AP

1 is also regarded as the measurement target AP 1 can be transmitted next, for example. Furthermore, instead of measurement information directly indicating the measurement target AP 1 using the identifier thereof, measurement information indicating a selection condition can be transmitted next. That is to say, the CPU 3 can specify a different AP 1 for which the channel state is obtained, each time it transmits measurement information.

By the CPU 3 transmitting, to the WD 2, measurement information for determining an AP 1 for which the channel state is obtained in this manner, the CPU 3 can obtain the state of the channel to a necessary AP 1 only, and the processing load of the CPU 3 can be reduced. Also, the WD 2 does not need to measure and make notification on the states of the channels to all of the APs 1, and thus the processing load of the WD 2 can also be reduced.

FIG. 3 is a diagram of a configuration of a processing apparatus 5 according to the present embodiment. The processing apparatus 5 can be included in the CPU 3, for example. The processing apparatus 5 includes one or more processors 50, and at least one non-transitory memory device 51 that stores a computer program. The at least one memory device 51 is a computer-readable storage medium. The computer program includes an instruction for causing the one or more processors 50 to execute the processing in the CPU 3 described with reference to FIG. 2, when executed by the one or more processors 50.

The processing apparatus 5 also includes a database unit 52. The database unit 52 is a database indicating positions at which the APs 1 of the cell-free communication system are deployed. In addition, if an upper limit value of the number of WDs 1 communicable with each AP 1 is set, the database unit 52 also stores the upper limit value of the AP 1. Note that the present disclosure is not limited to a configuration where the processing apparatus 5 includes the database unit 52. The database unit 52 can be included in an external apparatus accessible by the processing apparatus 5 via a network, for example.

FIG. 4 shows functional blocks that are realized in the processing apparatus 5 by the one or more processors 50 executing a computer program stored in the at least one memory device 51. As shown in FIG. 4, the one or more processors 50 function as a measurement information generation unit 55 and a processing unit 56.

The measurement information generation unit 55 generates measurement information that is transmitted in step S5 in FIG. 2. As described above, the measurement information can include an identifier for identifying the measurement target AP 1. In addition, as described above, the measurement information can include a selection condition on which a WD 1 selects the measurement target AP 1. When obtaining a measurement result from a WD 2 as a response to the measurement information, the processing unit 56 changes the cluster, performs scheduling of transmission of data with the WD 1, and the like based on channel state information included in the measurement result and indicating the state of the channel to the AP 1.

According to a first aspect of the present embodiment, a method performed by a processing apparatus of a cell-free communication system that includes a plurality of access points (APs) is provided. The method includes: transmitting, to a wireless device via a master AP among one or more APs included in a cluster associated with the wireless device, measurement information for the wireless device to determine a measurement target AP for which the wireless device measures a channel state; and receiving, as a response to the measurement information, channel state information indicating the channel state to the measurement target AP, via the master AP.

The measurement information may include an identifier of the measurement target AP. The one or more APs included in the cluster may be regarded as the measurement target AP. One or more neighboring APs to which distances from the one or more APs included in the cluster may be shorter than a predetermined value, and that are not included in the cluster may be regarded as the measurement target AP. an AP, which is included in the one or more neighboring APs and whose distance from the wireless device becomes shorter over time, may be regarded as the measurement target AP. An AP, which is included in the one or more neighboring APs, and is allowed to be newly added to the cluster for the wireless device, may be regarded as the measurement target AP.

The measurement information may include a selection condition on which the wireless device selects the measurement target AP. The selection condition may include a condition related to a number of APs for which the wireless device measures the channel state. The selection condition may include a condition related to strength or quality of a signal received by the wireless device. The selection condition may include a condition related to a temporal change in strength or quality of a signal received by the wireless device.

According to a second aspect of the present embodiment, a processing apparatus comprising one or more processors and a memory device for storing a program is provided. The program, when executed by the one or more processors, causes the processing apparatus to perform: transmitting, to a wireless device via a master AP among one or more APs included in a cluster associated with the wireless device, measurement information for the wireless device to determine a measurement target AP for which the wireless device measures a channel state; and receiving, as a response to the measurement information, channel state information indicating the channel state to the measurement target AP, via the master AP.

According to a third aspect of the present embodiment, a non-transitory computer-readable storage medium that stores a program is provided. The program includes a program instruction for causing, when executed by one or more processors of a processing apparatus, the processing apparatus to perform: transmitting, to a wireless device via a master AP among one or more APs included in a cluster associated with the wireless device, measurement information for the wireless device to determine a measurement target AP for which the wireless device measures a channel state; and receiving, as a response to the measurement information, channel state information indicating the channel state to the measurement target APs, via the master AP.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method performed by a processing apparatus of a cell-free communication system that includes a plurality of access points (APs), the method comprising:

transmitting, to a wireless device via a master AP among one or more APs included in a cluster associated with the wireless device, measurement information for the wireless device to determine a measurement target AP for which the wireless device measures a channel state; and receiving, as a response to the measurement information, channel state information indicating the channel state to the measurement target AP, via the master AP, wherein the measurement information includes an identifier of the measurement target AP, and wherein the one or more APs included in the cluster are regarded as the measurement target AP.

2. The method according to claim 1, wherein an AP, which is included in the one or more neighboring APs and whose distance from the wireless device becomes shorter over time, is regarded as the measurement target AP.

3. The method according to claim 1, wherein an AP, which is included in the one or more neighboring APs, and is allowed to be newly added to the cluster for the wireless device, is regarded as the measurement target AP.

4. The method according to claim 1, wherein the measurement information includes a selection condition on which the wireless device selects the measurement target AP.

5. The method according to claim 4, wherein the selection condition includes a condition related to a number of APs for which the wireless device measures the channel state.

6. The method according to claim 4, wherein the selection condition includes a condition related to strength or quality of a signal received by the wireless device.

7. The method according to claim 4, wherein the selection condition includes a condition related to a temporal change in strength or quality of a signal received by the wireless device.

8. A method performed by a processing apparatus of a cell-free communication system that includes a plurality of access points (APs), the method comprising:

transmitting, to a wireless device via a master AP among one or more APs included in a cluster associated with the wireless device, measurement information for the wireless device to determine a measurement target AP for which the wireless device measures a channel state; and receiving, as a response to the measurement information, channel state information indicating the channel state to the measurement target AP, via the master AP, wherein the measurement information includes an identifier of the measurement target AP, and wherein one or more neighboring APs to which distances from the one or more APs included in the cluster are shorter than a predetermined value, and that are not included in the cluster is regarded as the measurement target AP.

9. A processing apparatus comprising:

one or more processors; and a memory device for storing a program, wherein, when executed by the one or more processors, the program causes the processing apparatus to perform:

transmitting, to a wireless device via a master AP among one or more APs included in a cluster associated with the wireless device, measurement information for the wireless device to determine a measurement target AP for which the wireless device measures a channel state; and receiving, as a response to the measurement information, channel state information indicating the channel state to the measurement target AP, via the master AP, wherein the measurement information includes an identifier of the measurement target AP, and wherein the one or more APs included in the cluster are regarded as the measurement target AP.

10. A non-transitory computer-readable storage medium that stores a program, the program including a program instruction for causing, when executed by one or more processors of a processing apparatus, the processing apparatus to perform:

transmitting, to a wireless device via a master AP among one or more APs included in a cluster associated with the wireless device, measurement information for the wireless device to determine a measurement target AP for which the wireless device measures a channel state; and receiving, as a response to the measurement information, channel state information indicating the channel state to the measurement target APs, via the master AP, wherein the measurement information includes an identifier of the measurement target AP, and wherein the one or more APs included in the cluster are regarded as the measurement target AP.

* * * * *